(No Model.)
E. P. HAND.
MEAT AND VEGETABLE CUTTER.
No. 342,353. Patented May 25, 1886.
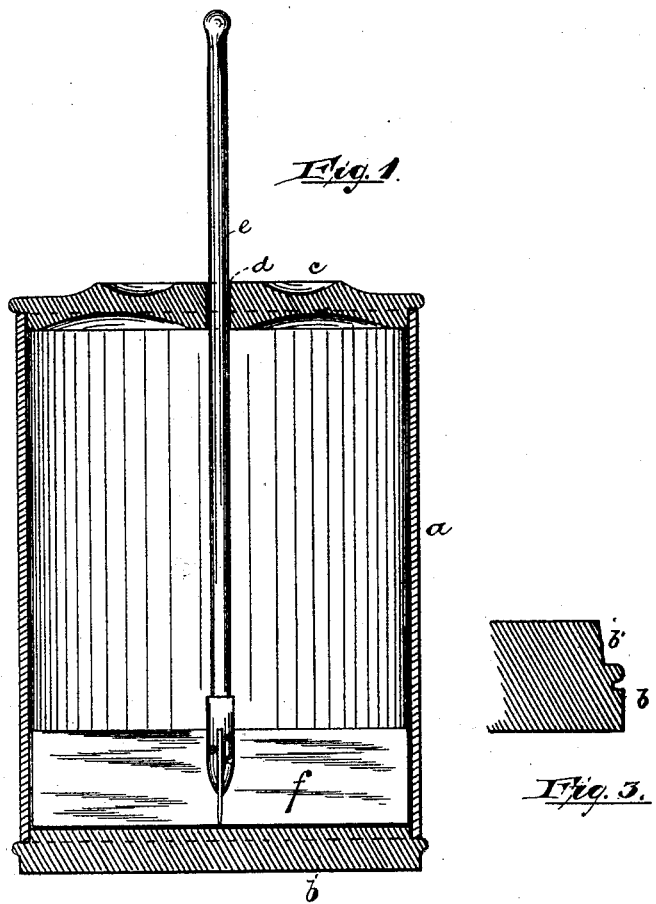
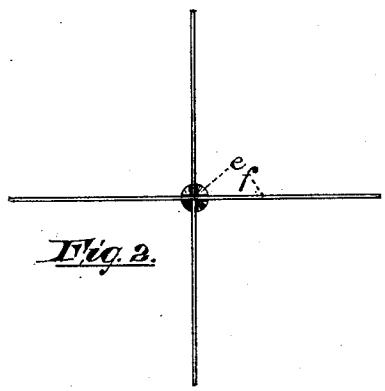
Attest:
Fredk. F. Campbell.
Oscar A. Michel
Inventor:
Edward Paddleford Hand,
by Drake & Co,
Attys

UNITED STATES PATENT OFFICE.

EDWARD PADDLEFORD HAND, OF NEWARK, NEW JERSEY.

MEAT AND VEGETABLE CUTTER.

SPECIFICATION forming part of Letters Patent No. 342,353, dated May 25, 1886.

Application filed January 13, 1885. Serial No. 152,802. (No model.)

*To all whom it may concern:*

Be it known that I, EDWARD PADDLEFORD HAND, a citizen of the United States, residing at Newark, in the county of Essex and State of New Jersey, have invented certain new and useful Improvements in Meat and Vegetable Cutters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a simple, cheap and effective device for cutting vegetables, fruit, meat, &c., for kitchen use more particularly, and one that can be readily cleaned after being in use.

It consists in the arrangement and combination of parts substantially as will be hereinafter set forth, and finally embodied in the clause of the claim.

Referring to the accompanying drawings, in which like letters of reference indicate corresponding parts in each of the figures, Figure 1 is a vertical section of my improved device. Fig. 2 is a plan of the knives arranged at the end of a plunger. Fig. 3 is an enlarged section of the edge of the bottom.

In said drawings, *a* indicates a body, made, preferably, of tin and cylindrical in shape. At one end of said body is secured a wooden bottom, which is cut so that the grain of the wood is vertical, and thus presents a soft bed to the knives, that will not chip under the influence of the knives. Said body is separable from the bottom to enable the parts to be detached from one another and readily and thoroughly cleaned after use. The edges of the bottom are provided with an incline, *b'*, Fig. 3, so that the parts may be wedged, and thus be held securely together, even though the wooden bottom should warp or shrink. The opposite end of the cylindrical body is provided with a cover, *c*, to prevent portions of the food from being thrown from the vessel and the escape of pungent odors from the meat or vegetables while the same are being chopped. Said cover is centrally perforated, as at *d*, to provide a bearing for a vertically-reciprocating plunger, *e*, which latter is provided with radial knives *f*, which extend laterally far enough to sweep the entire bottom within the limits of the body *a*, so as to properly come into contact with the matter to be desiccated.

I am aware that it is not new to provide churns with perforated covers and reciprocating dashers, and I do not herein wish to be understood as claiming the same. In my improvement the peculiar combination of parts described enable me to chop or slice with the knives the vegetables or meat in a chamber entirely separate from or having no free or open communication with the outer atmosphere, excepting such as may be occasioned by imperfect joints.

Having thus described the invention, what I claim as new is—

In combination, in a meat or vegetable cutter, a cylindrical body, a reciprocating cutter, a perforated cover, and a bottom providing a suitable block or bearing for said reciprocating cutter, said bottom being separable from said cylinder and provided with an inclined edge, *b'*, whereby it may be wedged into holding relation to the cylinder, substantially as set forth.

In testimony that I claim the foregoing I have hereunto set my hand this 29th day of December, 1884.

EDWARD PADDLEFORD HAND.

Witnesses:
CHARLES H. PELL,
FREDK. F. CAMPBELL.